United States Patent [19]
Darling

[11] 3,941,358
[45] Mar. 2, 1976

[54] CUTTING TORCH GUIDE

[76] Inventor: Lawrence M. Darling, 306 Goldenrod Ave., Corona Del Mar, Calif. 92625

[22] Filed: Apr. 24, 1975

[21] Appl. No.: 571,270

[52] U.S. Cl............... 266/23 E; 33/27 K; 266/23 F; 266/23 L; 266/23 B
[51] Int. Cl.².......................................... B23K 7/10
[58] Field of Search......... 33/27 R, 27 K; 266/23 R, 266/23 B, 23 E, 23 F, 23 L; 148/9

[56] References Cited
UNITED STATES PATENTS

| | | | |
|---|---|---|---|
| 2,269,505 | 1/1942 | Anderson | 266/23 F |
| 2,548,302 | 4/1951 | Gilson | 266/23 L X |
| 2,603,475 | 7/1952 | Rotsch | 266/23 F |
| 3,209,120 | 9/1965 | Glatthorn | 266/23 K X |
| 3,417,979 | 12/1968 | Cable et al. | 266/23 E |

Primary Examiner—Roy Lake
Assistant Examiner—Paul A. Bell
Attorney, Agent, or Firm—William C. Babcock

[57] ABSTRACT

A device that may be removably secured to a steel plate to guide a cutting torch in a circular path of a desired radius to form an opening in the plate. The device includes a cutting torch engageable socket, which socket is rotatably supported from a radially adjustable carriage. The carriage is movably supported from a circular track that is removably securable to the steel plate by permanent magnets. A radially disposed scale visually indicates when the cutting torch is at the center of the track, as well as the radius of the circular path through which the cutting torch travels when the carriage is rotated relative to the track.

5 Claims, 5 Drawing Figures

CUTTING TORCH GUIDE

BACKGROUND OF THE INVENTION

1. Field of the Invention

Cutting Torch Guide.

2. Description of the Prior Art

In the fabrication of steel structures involving steel plate, it is frequently desirable to cut circular openings on desired centers in the latter. Prior to the present invention there has been no device that may be centered at a desired location on a steel plate, and after such centering used to guide a cutting torch in a circular path to form an opening of desired radius in the plate.

A major object of the present invention is to supply a light weight, portable, cutting torch guide that may be centered at a desired location on a steel plate, and after which centering the device may be used to guide a cutting torch through a circular path of desired radius to form an opening in the plate.

Another object of the invention is to supply a cutting torch guide that is of relatively simple structure, can be fabricated from standard commercially available materials, and one that is simple and easy to use.

SUMMARY OF THE INVENTION

The cutting torch guide includes a circular track that is removably securable at a desired location to a steel plate by a number of spaced magnets. The magnets are preferably arranged in diametrically opposed pairs.

A frame is rotatably supported by grooved rollers within the frame, and the rollers rotatably engage the track. The frame includes a pair of spaced parallel guides on which a carriage is mounted for radial movement relative to the track. The carriage rotatably supports a socket that removably engages the free outer portion of a cutting torch. A scale is mounted in a fixed parallel position relative to one of the guides to visually indicate when the carriage supported socket is centered relative to the circular track, as well as the radius of the opening that will be cut in the plate when the torch is moved through a circular path.

DESCRIPTION OF THE PREFERRED EMBODIMENT

Figure 1:
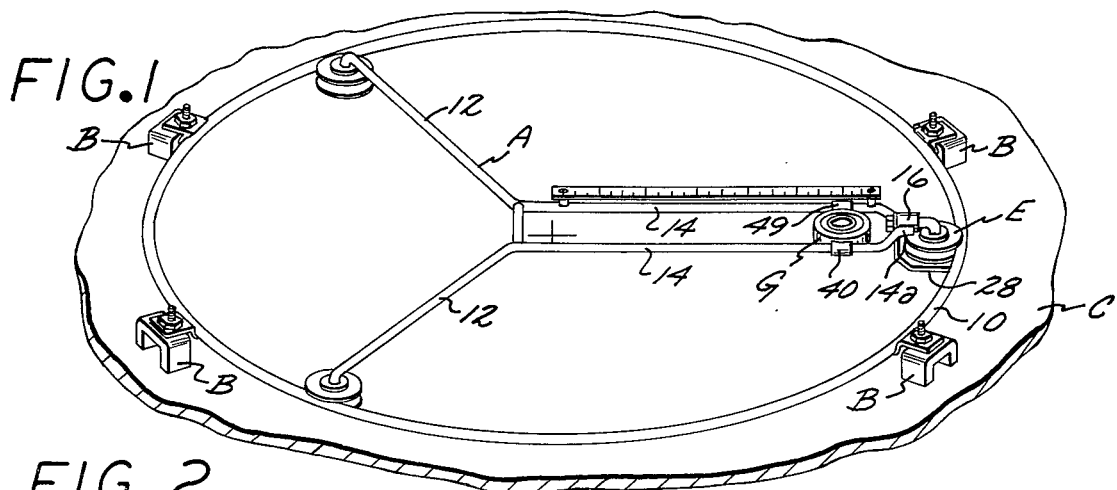
FIG. 1 is a perspective view of the cutting torch guide.
Figure 2:
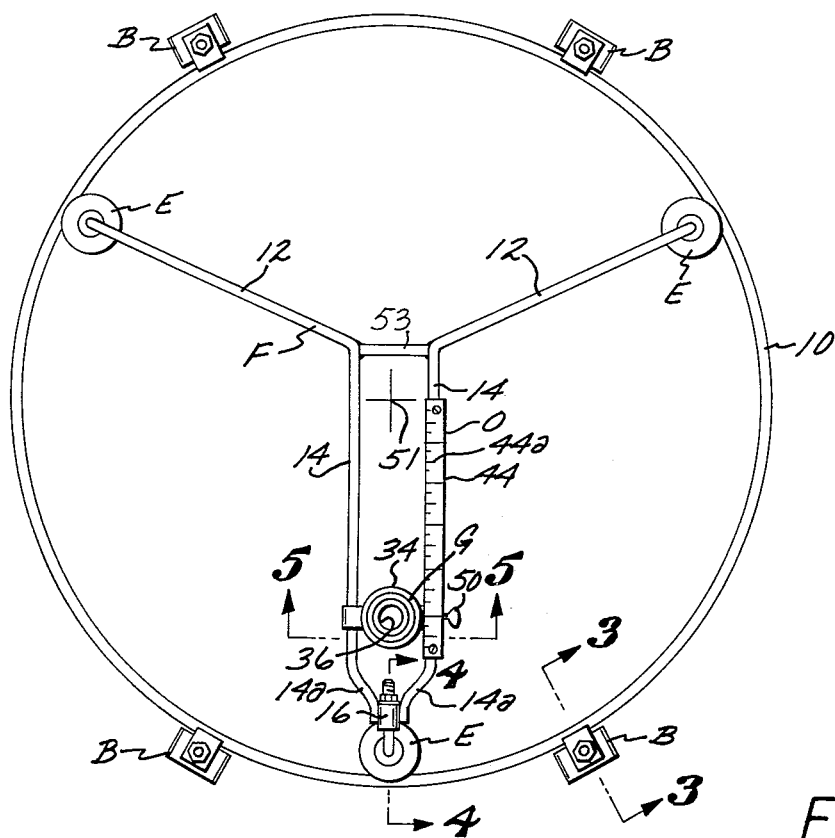
FIG. 2 is a top plan view of the guide.
Figure 5:
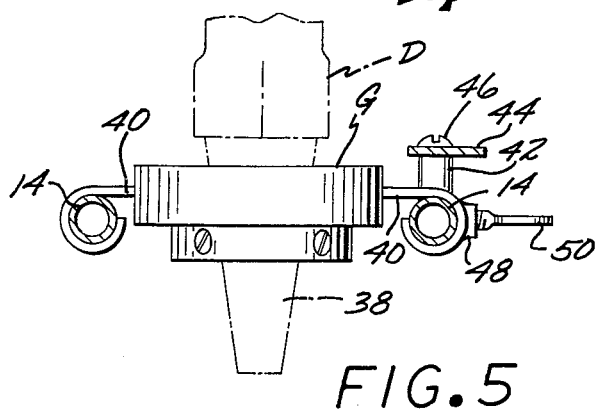
FIG. 5 is a combined transverse cross sectional and side elevational view of the guide taken on the line 5—5 of FIG. 2.

The cutting torch guide A as may best be seen in FIGS. 1 and 2, includes a circular tract 10, which by a number of magnets B, may be removably secured to a steel plate C. The cutting torch guide A when so secured to the plate C, may be removably engaged by a cutting torch D, as shown in FIG. 5. A frame F is provided, which frame as can be seen in FIGS. 1 and 2, is rotatably supported within the confines of the tract 10 by a number of grooved rollers E.

The frame F is defined by two angularly disposed arms 12 that extend away from one another, and these arms at their most adjacent ends develop into a pair of parallel guides 14, which guides on the ends 14a thereof are secured to opposite sides of a tubular collar 16. The tubular collar 16 has a longitudinal tapped bore formed therein.

Figure 4:
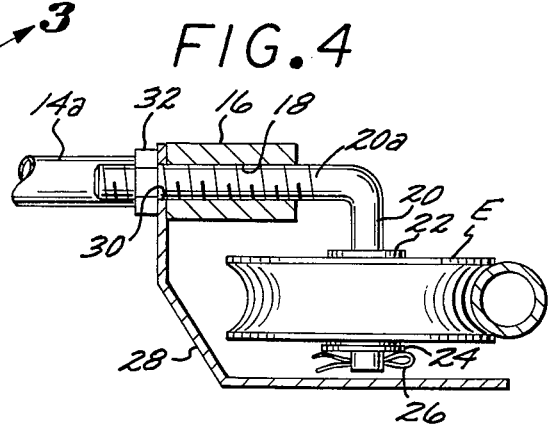
FIG. 4 is a second fragmentary transverse cross sectional view of the guide taken on the line 4—4 of FIG. 2.

A vertical shouldered shaft 20 is provided as shown in FIG. 4, which shaft on its upper end develops into a threaded extension 20a, which extension is normally disposed to the shaft. The shaft 20 has washers 22 and 24 mounted thereon between which washers a grooved roller E is rotatably supported. The free end of the shaft 20 has a transverse bore (not shown) formed therein through which a cotter pin 26 extends as may be seen in the drawing. The threaded extension 20a engages a tapped bore 18 as may be seen in FIG. 4, and extends to the left thereof a substantial distance. The projecting end of the extension 20a engages an opening 30 formed in an L-shaped heat shield 28, which heat shield is of sufficient width to prevent heat from the cutting torch D reaching the shaft 20 and the roller E rotatably supported on the latter.

A nut 32 engages the projecting threaded end portions of the shaft extension 20a, and when tightened into abutting contact with a shield 28 serves to support the shield in a roller protecting position as illustrated in FIG. 4.

A carriage G, as best seen in FIGS. 2 and 5, is slidably mounted on the pair of guides 14. The carriage G includes a ball bearing assembly 34 that has an inner rotatable portion 36 that may be removably and frictionally engaged by the tip portion 38 of the cutting torch D as shown in FIG. 5. The carriage G includes two laterally spaced slides 40 that engage the pair of guides 14 as shown in FIG. 5. One of the guides 14 has two spaced supports 42 extending upwardly therefrom as may be seen in FIGS. 1, 2 and 5, which supports have a gradated scale 44 secured to the upper ends of the supports by screws 46 or other suitable fastening means. One of the slides 40 as can be seen in FIG. 5, has a lug 48 extending outwardly therefrom, which lug has a tapped bore 48a therein that is engaged by a thumb screw 50. When the thumb screw 50 is rotated in an appropriate direction, the inwardly disposed end thereof is brought into frictional contact with one of the guides 14, to maintain the carriage G in a fixed position on the pair of guides 14. The scale 44 has gradations 44a defined thereon as shown in FIGS. 1 and 2. Carriage G has an index mark 49 defined thereon as shown in FIG. 1 that may be transversely aligned with a desired one of the gradations 44a to determine the distance the center of the carriage G is located relative to the center 51 of the circular tract 10. When index mark 49 is moved to the innermost one of the gradations 44a, the center of the cutting torch engageable rotatable portion 36 is aligned with the center 51. Rigid member 53 extends between the arms 12 as shown in FIG. 2, and may be so disposed relative to the center 51, that when the carriage G is in the innermost position possible on the guide 14, the center of the rotatable portion 36 thereof will be aligned with the center 51 of the tract 10. When the center of the rotatable portion 36 is aligned with the center 51, the index mark 49 on the carriage will be aligned with a zero gradation on the scale 44.

The magnets B as may best be seen in FIGS. 1 and 2, are preferably arranged in diametrically opposed pairs.

Figure 3:
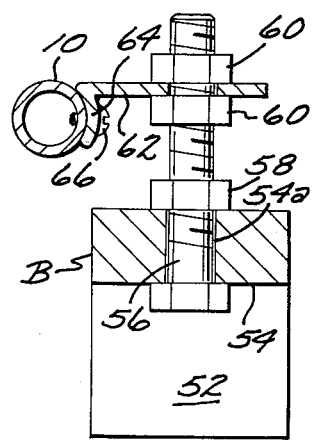
FIG. 3 is a fragmentary transverse cross sectional view of the guide taken on the line 3—3 of FIG. 2.

Each of the magnets B as shown in FIGS. 1 and 3 includes two laterally spaced legs 52 that are connected by a web 54. The web 54 has a bore 54a extending upwardly therethrough. Each bore 54a is engaged by an upwardly extending bolt 56 that, by a nut 58, is removably secured to the web 54. Two nuts 60 are provided that may be rotated to a desired elevation on the bolt 56 as shown in FIG. 3, and by tightening one of the nuts 60 relative to the other, the nuts are utilized to support a bracket 62 that has an arcuate shaped inner portion 64 that abuts against an externally disposed section of the tract 10. A screw 66 is provided for each of the brackets, and extends therethrough to engage the tract 10, and support the latter from the brackets.

The use and operation of the invention is extremely simple. The thumb screw 50 is loosened and the carriage G is then moved on the guide 14 to a position where the center of the rotatable portion 36 is aligned with the center 51 of the tract 10, which is achieved when the gradation mark 49 is transversely aligned with the zero gradation on scale 44. The thumb screw 50 is then rotated in a direction to hold a carriage G at the adjusted position of guides 14. The cutting torch guide A is then secured to plate C by use of magnets B in a position where the center of the rotatable portion 36 is aligned with the center on the plate C above which it is desired to form an opening of a desired radius.

The thumb screw 50 is now loosened, and the carriage G is moved on the guide 14 until the index mark 49 is aligned with the gradation on the scale 44 to the radius of the opening that is desired to be cut in the plate C. The thumb screw 50 is then tightened to hold the carriage G at the adjusted position on the guides 14. The cutting torch tip 38 is now inserted within the confines of the rotatable portion 36 as shown in FIG. 5, and the frame F is now rotated relative to the tract 10, with the torch cutting the plate as the frame is so rotated. After the cutting torch is traversed 360° on the plate C, being guided with the cutting torch guide assembly A, the opening has been formed in the plate, and the cutting torch D is removed from the guide A. The guide A is now removed from the plate C for subsequent use in the above-described manner.

The use and operation of the invention has been previously described and need not be repeated.

I claim:

1. In combination with a cutting torch, a device that is removably securable to a steel sheet for guiding said cutting torch in a circular path of desired radius to form a circular opening in said sheet, said device including:
    a. a ring shaped track;
    b. magnetic means for holding said track at a desired location on said sheet and in spaced relationship thereto;
    c. a frame assembly disposed within said track, said assembly including two parallel laterally spaced guides that on first ends thereof develop into two angularly positioned arms, said two arms on the free ends thereof developing into two first shafts disposed within said track, a tubular collar disposed between said guides and secured to the ends thereof opposite that from which said arms extend;
    d. a second shaft having an extension normally disposed thereto, said extension adjustably mounted in said collar;
    e. two first grooved rollers rotatably supported on said first shafts and a second grooved roller rotatably supported on said second shaft, said first and second rollers in engagement with the interior surface of said track;
    f. first means for selectively locking said second shaft extension at a desired position relative said collar to maintain said first and second grooved rollers in engagement with said track;
    g. a carriage slidably mounted on said guides;
    h. rotatable means on said carriage that may be engaged by said cutting torch;
    i. visual means for indicating the distance of said carriage supported rotatable means from the center of said track;
    j. second means for locking said carriage at a position determined by use of said visual means to rotate said carriage through a circular path relative to said track for said torch to cut an opening of desired radius in said sheet; and
    k. heat shield means situated between said second roller and carriage to protect said second roller and second shaft from heat from said cutting torch.

2. A device as defined in claim 1 in which said collar has a longitudinal bore therein and said second shaft extension has threads formed thereon, said second shaft extension extending through said bore, and said first means is a nut that engages said threads and bears against said collar.

3. A device as defined in claim 1 in which said rotatable means is a ball bearing assembly that includes an inner race that frictionally engages said cutting torch when the latter is partially extended therethrough, with said inner race rotating relative to said carriage as said cutting torch is moved through a circular path.

4. A device as defined in claim 1 in which said visual means is a gradated elongate scale secured in a fixed parallel position on one of said guides.

5. A device as defined in claim 1 in which said carriage has a tapped bore in a portion thereof that is in communication with one of said guides, and said second means is a thumb screw that engages said tapped bore, said thumb screw when rotated in a first direction in said tapped bore having an end portion thereof forced into frictional engagement with one of said guides.

* * * * *